United States Patent
Flexeder et al.

(10) Patent No.: US 11,977,478 B2
(45) Date of Patent: May 7, 2024

(54) COMPOSITIONAL VERIFICATION OF EMBEDDED SOFTWARE SYSTEMS

(71) Applicant: Robert Bosch GmbH, Stuttgart (DE)

(72) Inventors: Andrea Flexeder, Erdmannhausen (DE); Bernard Schmidt, Koblenz (DE); Jochen Quante, Ludwigsburg (DE); Maximilian Schlund, Boeblingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 133 days.

(21) Appl. No.: 17/868,017

(22) Filed: Jul. 19, 2022

(65) Prior Publication Data

US 2023/0023480 A1    Jan. 26, 2023

(51) Int. Cl.
    *G06F 11/36* (2006.01)

(52) U.S. Cl.
    CPC ...... *G06F 11/3688* (2013.01); *G06F 11/3696* (2013.01)

(58) Field of Classification Search
    None
    See application file for complete search history.

(56) References Cited

U.S. PATENT DOCUMENTS

| | | | | |
|---|---|---|---|---|
| 2006/0150160 A1* | 7/2006 | Taft | ..................... | G06F 11/3604 717/126 |
| 2006/0265676 A1* | 11/2006 | Zhu | ......................... | G06F 8/10 716/106 |
| 2008/0295079 A1* | 11/2008 | Yiftachel | ............ | G06F 11/3692 717/126 |
| 2011/0088016 A1* | 4/2011 | Ball | ......................... | G06F 8/43 717/128 |
| 2015/0220419 A1* | 8/2015 | Cassez | ................ | G06F 11/3604 717/124 |

* cited by examiner

*Primary Examiner* — Qing Chen
(74) *Attorney, Agent, or Firm* — NORTON ROSE FULBRIGHT US LLP; Gerard A. Messina

(57) ABSTRACT

A computer-implemented method for static testing a software system that is decomposed into software units connected by interfaces. The method comprises receiving context information for an interface, which includes at least one postcondition for the at least one output variable of a respective first software unit and/or a precondition for the input variable of a respective second software unit; receiving a selection of a third software unit in so that a substitute decomposition appertaining thereto of the software system into the third software unit and a complement of the third software unit is produced, the third software unit and the complement forming the software system and being connected via a substitute interface; selecting, based on the item of context information a postcondition per output variable of the complement; and testing whether the selected postcondition can be forward-propagated by the third software unit with regard to a formal verification.

14 Claims, 3 Drawing Sheets

COMPOSITIONAL VERIFICATION OF EMBEDDED SOFTWARE SYSTEMS

BACKGROUND INFORMATION

Software, in particular of a certain degree of complexity, may have errors. One class of errors is formed for example by runtime errors that occur during the runtime of the software. Runtime errors can cause the software to crash, or can cause incorrect behavior of the software. The incorrect behavior of the software may remain undetected during development and/or a test, and may cause crashing of the software during later use.

In software, especially in safety-relevant software, runtime errors should not occur. If a runtime error nonetheless occurs when the software is being executed, the execution of the software may be forcibly interrupted. A functionality provided by the execution of the software may then no longer be provided (e.g. if an error sequence is not caught by a redundancy in the safety architecture). If a runtime error causes incorrect behavior of the software, the functionality of the software may likewise be disturbed or canceled. Runtime errors may occur for example when implicit assumptions of the programming language in which the software was programmed are not adhered to. For example, when there is a division, the divisor cannot be zero, or array elements outside the defined array size must not be accessed. If this nonetheless happens, then this usually results in undefined behavior, false results, and/or crashing of the software.

Software can be designed to monitor, to control, and/or to regulate a technical system, in particular, e.g., a driving system. The effect (e.g. the error consequences) of a runtime error in the execution of the software can in general be a function of many factors (system, environment, cases of application, open context, ... ). In the worst cases, the effect (e.g. the error consequences) can include accidents, damage, injury, and/or death. For example, a runtime error that includes division by zero can cause a crash in the execution of the software, which then can no longer perform its actual task (e.g. controlling the brakes or triggering the airbag). Another example is overwriting a memory region with incorrect data, e.g. if writing takes place beyond array boundaries, thus unintentionally changing other variables that happen to be situated there, which can cause incorrect behavior or crashing. Technical systems can be safety-critical for the user and/or for the environment of the technical system. The software used in such a technical system may also be safety-critical. However, software may also be safety-critical independently of a technical system.

Therefore, in particular in the case of safety-critical software, measures are necessary that can and are intended to ensure the absence of errors in the software. Frequently, extensive tests of the software are carried out for this purpose. However, tests can only indicate the presence of errors, and cannot prove their absence, because they can always test only particular individual configurations or scenarios ("random samples"), but cannot test the correct behavior of the software in all configurations/scenarios.

There are approaches to the formal verification of software that can formally prove the absence of errors in the software. Frequently, these require a formal specification that is usually not provided and whose creation can be complicated. However, for the class of runtime errors, the formal specification is generically available. Approaches to formal verification include abstract interpretation and model checking. In abstract interpretation, the instructions of the program are carried out on an abstract domain. Given suitable choice of the abstract domain, a good over approximation of the program behavior can be ascertained in this way. In contrast, model checking tests a model of the program against a formal specification, e.g. in temporal logic. Bounded Model Checking (BMC) is a specific variant of model checking that yields a valid assessment only up to a specified bound. In comparison to many model checking approaches, BMC is better for use in automated contexts.

Many commercial tools exist that are capable of testing software for runtime errors using these methods (e.g., Astrée by Absint, and Polyspace CodeProver by MathWorks), as well as some tools from the university domain (e.g., CBMC, from Oxford University). However, all of these tools have the problem that they either do not scale to large software systems or they provide a large number of false positive results. The false positives frequently result due to the fact that these tools are designed conservatively in order not to overlook errors (soundness), which in principle can make sense for safety-relevant systems. However, the more complex the system to be analyzed is, the more imprecise the analysis becomes, and the more false positive error messages may then be displayed. False positive error messages can be for example notifications of errors that in reality can never occur. This is due to above all to the fact that, as the complexity of the system increases, not all items of information can be held available precisely (that is, they have to be summarized or extracted), because otherwise memory consumption and runtime would increase exponentially and it would then no longer be possible to run the error analysis.

If, in contrast, parts of the system are analyzed individually, then information is lacking about their context, which also results in many false positive messages. In the case of many false positive messages, in particular when they have to be manually checked, this results in an enormous outlay which often cannot be managed, making the use of these tools in an industrial setting practically impossible.

Frequently, the software is a software system that includes a plurality of software units that can interact with one another via interfaces. The interface of a software unit can be made up of, in addition to the function call and the associated parameters, the return value and possibly the commonly used memory. For example, the software system can include a software unit A and a software unit B that are connected via an interface. In addition, the software system can for example include software units C and D that are each connected to software unit A via an interface. The testing of software unit A can now for example traditionally either take place in isolated fashion or in the context of the overall software system:

In the first case, the interfaces are open at all sides (e.g. to software units B, C, and D), and nothing more is known about the context. Here, possible forms of use have to be inferred only on the basis of the syntax of the interfaces, which can however include many possible uses that will never occur. This in turn usually results in many false positive (error) messages.

In the second case, the entire software system is tested together. In this way, complete context information is present. However, for real cases the software system quickly becomes so large that testing can be done only very superficially, which limits the precision of the analysis. For example, loops cannot be analyzed more precisely and have to be over approximated. This usually also results in many false positive (error) messages.

Contracts (first described in 1986 by Bertrand Meyer for Eiffel, for contract-based programming), which define the interface of a function or of a module more precisely, are available. Contracts include specific preconditions that have to be fulfilled for a function/module to function correctly, as well as postconditions that the function/model then ensures. In research work, it has been attempted to build contracts into programming languages and statically test them (e.g. Spec #for C #or JML for Java, contract attributes in C++ 2x), but not under the aspect of the compositional verification of embedded software systems. In practice, up till now contracts have been tested only for runtime (assurances), and not statically.

The developer can for example write contracts by hand. These can be made up of, inter alia, preconditions and postconditions. Here, preconditions describe additional limitations on the input variables, or on the state of the software (component) (e.g. function, module, class, subsystem) that have to be fulfilled for the software (component) to operate correctly.

Postconditions correspondingly describe the state of the system after the execution of a component (e.g. state of the component or possible return values of a function). Robust software should ideally need no preconditions. However, it is frequently the case that software cannot be designed in a completely robust manner, for reasons of performance, algorithmic compatibility, and relations of dependence with other components. In order to secure these components and thus to guarantee the correct overall behavior, contracts can be used.

For everyday commercial use, the manual writing of formal contracts, i.e., the creation of the correct preconditions and postconditions for each individual software component, has been established only for a few small, extremely safety-critical systems. Generally, the outlay for broad use is too high. In addition, software is mostly based on a large portion of so-called legacy code (already-existing (i.e. older) programming code, e.g. from a precursor project) that is not regularly returned to and/or further developed by the developers. A later, retrofitted manual addition of preconditions for these components is difficult and/or time-consuming in practice, and is thus frequently not realizable, in particular when in the meantime software developers have for example changed their position, and/or the additional implicit knowledge of the software developers for the legacy code is no longer available. Therefore, it is advantageous to be able to automatically derive contracts (preconditions and/or postconditions) from the programming code.

SUMMARY

A first general aspect of the present invention relates to a computer-implemented method for the static testing of a software system that is decomposed into a multiplicity of software units. Between the software units there are one or a plurality of interfaces, each interface connecting a respective first and a respective second software unit of the multiplicity of software units at least insofar as the respective first software unit has at least one output variable that acts as at least one input variable for the respective second software unit. In accordance with an example embodiment of the present invention, the method includes receiving an item of context information for at least one interface, the context information including in each case at least one postcondition for the at least one output variable of the respective first software unit and/or at least one precondition for the at least one input variable of the respective software unit; receiving a selection of a third software unit from the multiplicity of software units in such a way that a thereto appertaining substitute decomposition of the software system into the third software unit and a complement of the third software unit is produced, the third software unit and the complement forming the software system and being connected via a substitute interface at least insofar as the complement has at least one output variable that acts as input variable for the third software unit; selection, at least on the basis of the context information received for the at least one interface, of at least one postcondition per output variable of the complement that acts as input variable of the third software unit; and testing whether the one or the plurality of selected postconditions can be forward-propagated by the third software unit with regard to a formal verification.

A second general aspect of the present invention relates to a software unit that, as third software unit, has been tested and/or has been enabled according to the computer-implemented method for the static testing of the software system according to the first general aspect (or a specific embodiment thereof).

A third general aspect of the present invention relates to a software system in which each software unit of the multiplicity of software units, as respective third software unit, has been tested and/or has been enabled according to the computer-implemented method for static testing of the software system according to the first general aspect (or a specific embodiment thereof).

A fourth general aspect of the present invention relates to a method that includes provision of the software system according to the third general aspect (or a specific embodiment thereof) and, optionally, use of the software system.

The method proposed in the present invention according to the first general aspect (or a specific embodiment thereof) enables a static test of software units of the software system, and thus of the overall software system, for runtime errors. For example, in this way an embedded system (embedded software) for monitoring, controlling, and/or regulating a technical system (e.g. a vehicle) can be verified with regard to runtime errors. In addition to local errors, the static test can also find integration errors; integration errors can occur not within software units but rather at the interfaces between software units. In particular in software systems having a certain degree of complexity, such as those used for example as an embedded system for controlling a technical system (e.g., a vehicle), early testability already during development—not waiting until after integration—usually proves to be advantageous, because errors can then be corrected early and in particular in good time and the functionality can be improved. For example, software units of a software system having a certain minimum degree of complexity are frequently developed (and verified) in a product development process by different developers more or less simultaneously. A complete test of a version of an individual software unit in interaction with current versions of all other software units of the software system may be complicated and even impossible for logistical reasons. Via the behavior for example agreed upon in advance (e.g., contracts having preconditions for input variables and/or postconditions for output variables of interfaces) between the software units of the software system, in the method according to the first general aspect (or a specific embodiment thereof), for an individual software unit (i.e., for the third software unit) a desired or planned behavior of all further software units can be abstracted. In this way, the individual software unit can be tested independently of the state of development of the further software units.

This procedure can be repeated for the individual software unit (i.e., for the third software unit) at different times in the development process. The method can thus be applied incrementally. In addition, the procedure can also be repeated for each further software unit of the software system. In this way, the overall software system can be verified.

Further advantages of the method provided according to the present invention according to the first general aspect (or a specific embodiment thereof) include that as few false positive error messages are produced as possible, and the method can also scale to large software systems. This can be achieved in that the software unit to be tested (i.e. the third software unit) is not completely isolated from the further software units (i.e. from the complement), insofar as preconditions and/or postconditions at the interfaces (i.e. at the substitute interface) to the further software units are retained and taken into account. In addition, software systems can also be analyzed that are made up of heterogenous components. Such heterogeneity can result for example from different programming languages, supplied black-box components, artificial intelligence components, etc. Thus, according to the first general aspect (or a specific embodiment thereof) the method is suitable for complex and/or safety-relevant software systems such as embedded systems for monitoring, controlling, and/or regulating a technical system (e.g., a vehicle).

Individual software units can be tested in isolated fashion taking into account their planned context of use, e.g. already during their development, and in particular when not all software units of the software system are available yet, as is frequently the case in practice. Up to now, it has for example not been possible to carry out a test in a context of use until the very end of development, after the integration of all units. This is disadvantageous insofar as the removal of an error is more expensive the later it is discovered. In addition, after a change (e.g. after a correction) only the involved component has to be tested again, and not the entire software system. This is advantageous in particular when there are different responsibilities and/or enable modalities for the software units. Through the method according to the first general aspect (or a specific embodiment thereof), times between the discovery and the removal of errors, as well as renewed approval through testing where appropriate, can be shortened, and in this way the quality of the software system can be improved.

The results of the isolated testing of software units can be used to simplify a later integration analysis and/or to completely replace it, and thus to recognize integration errors already during development, and in particular in earlier stages of development. The integration analysis can e.g. include only the testing of the compatibility of all contracts with one another, and in this way is substantially faster than was previously the case. In currently used tools, this test may extend over several days.

Because in each case only individual software units are tested, according to the first general aspect (or a specific embodiment thereof) the method is able to carry out the test in a shorter time without running into a scaling problem.

For the testing of an individual unit, the analysis can be done very precisely, because no scaling problem arises. In this way, the number of false positive error messages can be minimized, and the manual testing effort for these messages is reduced.

Through the abstraction of components through their contracts, analysis going beyond the boundaries of programming languages is also enabled. In addition, components can also be included whose content is not available as source code (e.g., supplied software).

DETAILED DESCRIPTION OF EXAMPLE EMBODIMENTS

Figure 1:
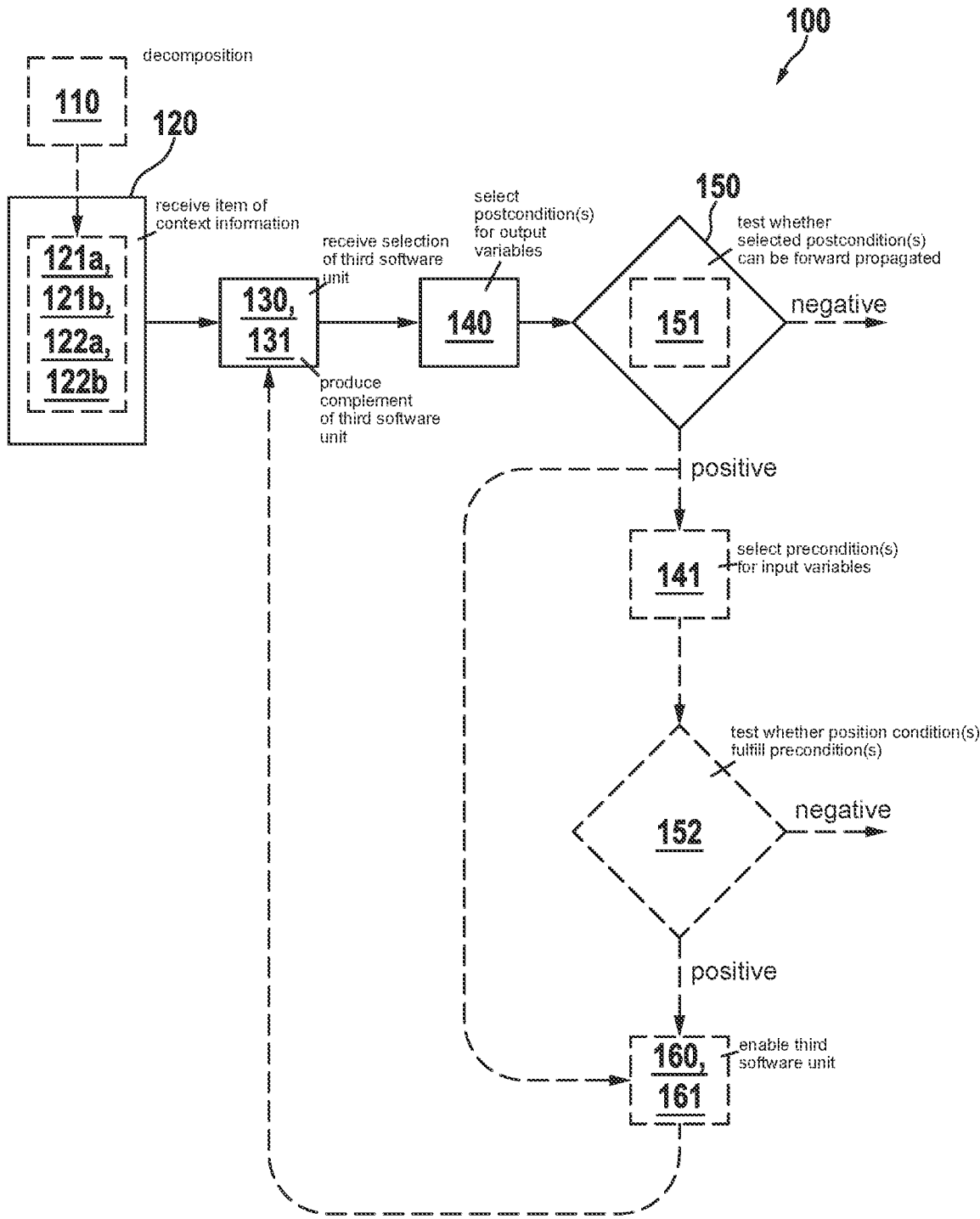
FIG. 1 schematically illustrates a computer-implemented method for the static testing of a software system, according to an example embodiment of the present invention.

The computer-implemented method 100 illustrated schematically in FIG. 1 is intended for the static testing of software units of a software system and/or the static testing of the software system. Software system 10 can be for example an embedded system, and or can be designed to be implemented in an embedded system (here in the sense of a computer system). Software system 10 can be designed to monitor, to control and/or to regulate a technical system, in particular a driving system. The driving system can be for example a control device software unit, e.g. for the engine controlling. The technical system, in particular the driving system, can be safety-critical. An embedded system can be a computer system, e.g. including a processor, a memory, and input and output devices, that is integrated in a technical context. For example, the computer system can have a dedicated functionality within a larger technical system, in particular a larger mechatronic system.

First disclosed is a computer-implemented method 100 for the static testing of a software system 10 that is decomposed into a multiplicity of software units 20, 21, 22, 23, 24, 25. Such decompositions are shown for example in FIGS. 2A-2B. The multiplicity of software units can comprise for example $\geq 2$, $\geq 3$, $\geq 4$, $\geq 5$, $\geq 10$, $\geq 50$, $\geq 100$, $\geq 1e3$, $\geq 1e4$ software units. In contrast to a dynamic test, the static test does not depend on the software units being realized with concrete values. This can be an advantage insofar as the concrete realization requires concrete input, which generally may at best also include random sample tests. There are one or a plurality of interfaces between software units 20-25. This does not mean that every software unit is connected to every other software unit via an interface.

Figure 2A:
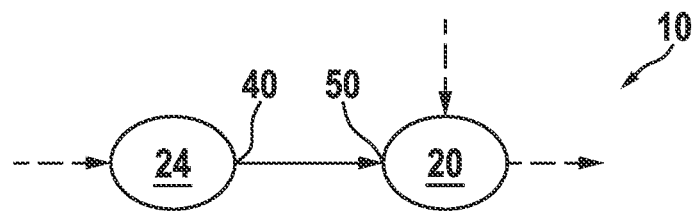
FIG. 2A schematically illustrates an example of a software system having at least two software units that are connected to one another via an interface.
Figure 2B:
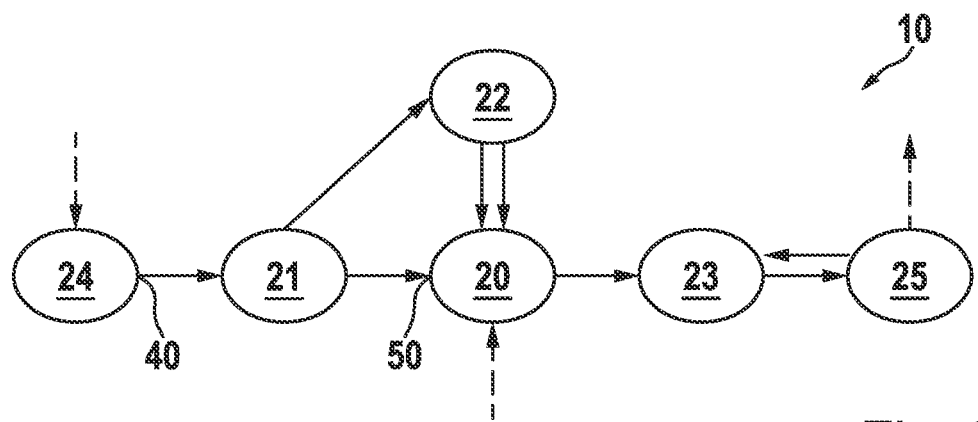
FIG. 2B schematically illustrates an example of a software system having six software units, some of which are connected to one another via interfaces.

The rather trivial case in which a software unit is not connected to one of the further software units via an interface is not excluded, but is not of particular interest due to the lack of interaction with the other software units. The same holds for a group of software units of which none is connected via an interface to a remaining group of software units. In FIG. 2B, for example software unit 24 is not connected to software unit 25 via an interface, but is connected to it via a plurality of interfaces and software units 20, 21, 22, 23. In the decomposition of software system 10, there can be at least one interface. Each interface connects a respective first and a respective second software unit of the multiplicity of software units 20-25 at least insofar as the respective first software unit 20, 21, 22, 23, 24 has at least one output variable 40 that acts as at least one input variable 50 for the respective second software unit 20, 21, 22, 23, 25. The terms "first/second respective software unit" refer to a (concrete) interface. For example, software unit 21 in FIG. 2B is a first software unit for the interface between software unit 21 and software unit 20. For this interface, software unit 20 is a second software unit.

Figure 2C:
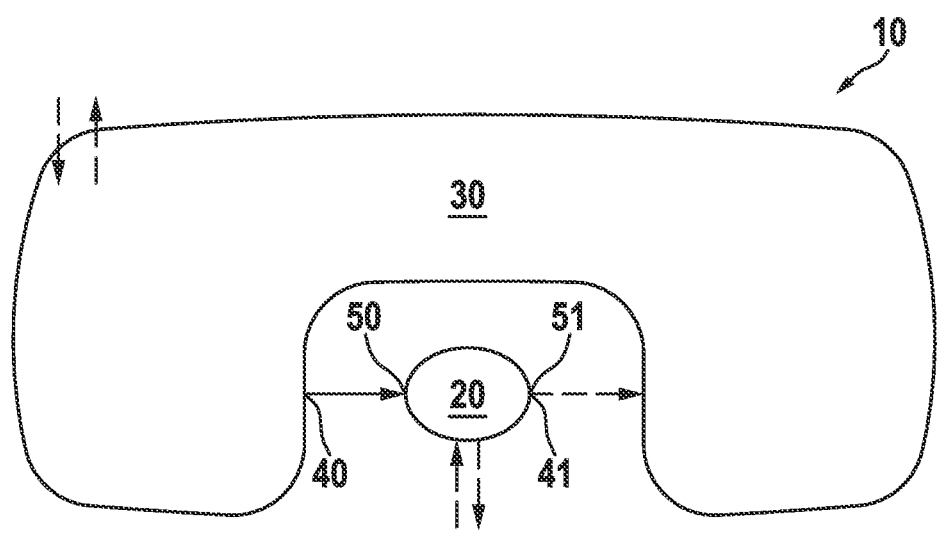
FIG. 2C schematically illustrates a substitute decomposition having a third software unit and its complement, connected to one another via an interface.

On the other hand, software unit 21 in FIG. 2B is also a first software unit for the interface between software unit 20 and software unit 23, etc. A respective second software unit can (see "interface connects . . . at least insofar as . . . ") In addition have at least one output variable that acts as at least one input variable for the respective first software unit. Such an interface is shown for example in FIG. 2B between software units 23 and 25. Circular ring connections can be consistent insofar as one or a plurality of output variables are a function of one or a plurality of input variables at a previous computing step (e.g. interrupt). In addition, an interface can include a plurality of input variables and/or output variables; see for example software units 20, 21, 22 in FIG. 2B. In addition, each software unit can have one or a plurality of global input variables and/or one or a plurality of global output variables. Such global input or output variables are shown in FIGS. 2A-2C by dashed arrows. They are thus at the same time input and/or output variables of the software system.

Method 100 includes reception 120 of an item of context information for at least one interface, the context information including in each case at least one postcondition for the at least one output variable 40 of the respective first software unit, and/or at least one precondition for the at least one input variable 50 of the respective second software unit. The item of context information can for example be derived from contracts per interface. In addition, method 100 can include reception of at least one (global) postcondition for at least one global input variable. Such a (global) postcondition can e.g. be provided from a specification, in particular a sensor specification, or as a postcondition for a still larger software system that includes software system 10. In addition, method 100 can include reception of at least one precondition for at least one global output variable. Such a (global) precondition can in turn be provided for example from a specification, in particular a driver specification, or as a precondition for a still larger software system that includes the software system.

In addition, method 100 includes reception 130 of a selection of a third software unit 20 from the multiplicity of software units 20-25, in such a way that a substitute decomposition appertaining thereto (i.e. to third software unit 20) of software system 10 into third software unit 20 and a (mathematically: the) complement 30 of third software unit 20 is produced 131, the third software unit 20 and the complement 30 forming software system 10 and being connected via a substitute interface at least insofar as complement 30 has at least one output variable 40 that acts as input variable 50 for third software unit 20. In other words, in the substitute decomposition there exists a substitute interface. Third software unit 20 is the software unit that is to be tested. In FIGS. 2B-2C, for example software unit 20 is received/selected 130, and the substitute decomposition appertaining thereto of software system 10 is formed in that software units 21, 22, 23, 24, 25 form a complement that is connected to software unit 20 via the substitute interface. As described above, the case in which the third software unit is not connected to complement 30 via a substitute interface is not of interest for the static test. The existence of a substitute interface implies the existence of at least one interface. Conversely, the existence of at least one interface in the decomposition of software system 10 permits at least one substitute decomposition and in particular the reception/selection 130 of at least one third software unit 20. A substitute decomposition belonging to a third software unit can be fictive, i.e. it is not necessarily required that the further software units be physically united (e.g. in a module etc.) to form a complement. Instead (see next step 140), it can be sufficient to abstract the complement via its (relevant) items of context information. This process can also be referred to as cutting out the third software unit. The designation "third software unit" does not imply that there have to be at least three software units. In fact, for example in FIG. 2A as well, software unit 20 can be received/selected 130 as third software unit, and the substitute decomposition appertaining thereto can be produced 131 having a complement 30 made up of software unit 24. Reception 130 can for example include selection via a user interface of a programming and/or integration environment, and can thus be made dependent on an input by a user (e.g. a programmer). Alternatively, reception 130 can be an automated selection. For example, the automated selection can be a substep in a loop over a plurality (e.g. only those in the actual area of responsibility) and/or all (third) software units of the decomposition of software system 10. In such a selection, a test can be implicitly contained of whether a substitute decomposition with a substitute interface is possible. Thus, in such a loop each software unit of software system 10, and thus the entire software system 10, can be statically tested.

Method 100 further includes selection 140, at least on the basis of the context information received 120 for the at least one interface, of at least one postcondition per output variable 40 of complement 30, acting as input variable 50 of third software unit 20. In addition, method 100 can include selection of at least one (global) postcondition for at least one global input variable. Method 100 can include selection of, in each case, at least one postcondition (global or local) for each input variable (global or local) of third software unit 20. A non-global postcondition—i.e. a postcondition that is not assigned to a global input variable, but rather to an output variable of a software unit of the software system—can be referred to as a local postcondition. A non-global precondition—i.e. a precondition that is not assigned to a global output variable, but rather to an input variable of a software unit of the software system—can be designated a local input condition. The selection (e.g. 140) can result immediately from the topology of the decomposition of the software system into software units and interfaces, or from the topology of the substitute decomposition of the software system into the third software unit and its complement.

The method 100 further includes tests 150 of whether the one or the plurality of selected 140 postconditions (and/or the one or the plurality of selected global postconditions) can be forward-propagated 151 by the third software unit 20 with regard to a formal verification (e.g. without error). The formal verification can for example be that no runtime errors are permitted to occur. Test 150 can then be a test of whether the selected postconditions (global and/or local) of the input variables of third software unit 20 can be forward-propagated up to at least one end of third software unit 20 without the possibility of the occurrence of a runtime error. If a runtime error could occur, then test 150 turns out negative. Otherwise, test 150 turns out positive (i.e. successful). In other words, the forward propagation 151 is started and, in the positive case, runs up to the at least one end of third software unit 20. In the negative case, in contrast, the forward propagation 151 is aborted and the at least one end of third software unit 20 cannot be reached. Contrary to the representation in FIG. 1, a negative result (like a positive result) can for example be played back to the user via a user interface. Alternatively or in addition, for example test 150 can include a test of whether all assurances in third software unit 20 during the forward propagation of the input variables of third software unit 20 up to at least one end of third software unit 20 can be maintained.

Other criteria for the formal verification are possible. The sequence of steps in FIG. 1 is given as an example. For example, step 120 can also follow after step 130, and in addition can coincide with step 140. The depicted sequence can be advantageous if a loop is to take place over a plurality of third software units. This is because step 120 then has to take place only once and does not have to be repeated.

As is shown as an example in FIG. 2C, third software unit 20 and complement 30 can also be connected at least insofar as third software unit 20 has at least one output variable 41 that acts as input variable 51 for complement 30 (e.g. for the next calculation step). Method 100 can in addition include selection 141, at least on the basis of at least one item of context information (i.e. an item of context information of a further interface), of at least one precondition per input variable 51 of complement 30 populated with data by an output variable 41 of third software unit 20. In addition, method 100 can include selection of at least one (global) precondition for at least one global output variable. Method 100 can include selection in each case of at least one precondition (global or local) for each output variable (global or local) of third software unit 20. The selection (e.g. 141) can result immediately from the topology of the decomposition of the software system into software units and interfaces, or from the topology of the substitute decomposition of the software system into the third software unit and its complement.

Method 100 can in addition include testing 152 of whether the one or the plurality of selected 140 postconditions, forward-propagated 151 by the software unit with regard to formal verification, fulfill the one or the plurality of selected 141 preconditions per input variable 51 of complement 30.

Alternatively or in addition, method 100 can include testing of whether the selected (e.g. 140) global and/or local postconditions, forward-propagated by the software unit with regard to the formal verification, fulfill the one or the plurality of selected 141 preconditions per input variable 51 of the complement and/or the one or the plurality of selected global preconditions. The test 152 can turn out negative or positive (i.e. successful). Contrary to the representation in FIG. 1, a negative result (like a positive one) can be played back to the user for example via a user interface.

Method 100 can be designed to recognize runtime errors in software units 20-25 and/or in software system 10. In fact, negative test results can be played back to the user for example via a user interface of a programming and/or integration environment. In this way, the user can for example introduce measures that provide a remedy, and that bring about a positive test result when there is a retest 150, 152. This positive test result may be required for an enabling of third software unit 20 and/or of the entire software system 10. The remedy can be provided for example in that a programming code of the third software unit is modified and/or corrected, and in this way for example a runtime error that was found is avoided.

The forward propagation 151 of the one or the plurality of produced 140 postconditions and/or the one or the plurality of selected global postconditions by third software unit 20 can be based on abstract calculation. The abstract calculation can be completely or partly analytical (i.e. non-concrete). The abstract calculation thus does not have to be a function of a concrete input. In contrast to the concrete input, which for example would cover only random sample tests, because not all concrete input configurations can be realized (in a given time period), an analytical calculation can also acquire and evaluate value ranges (domains) of input. Through the abstract calculation, the computing time can be reduced. For example, when there is a division in the programming code (in particular cases) it can be analytically calculated when the divisor is zero. From this, one or more conditions on the input can then be ascertained that prevent the possibility of the occurrence of a division by zero. Alternatively or in addition, the forward propagation 151 can be based on a concrete calculation. For example, the forward propagation 151 can sometimes be based on a probabilistic input (e.g. for one or a plurality of global output variables) in the manner of Monte Carlo. In this way, for example external influences, in particular sensor influences, can be also taken into account at least in a probabilistic manner.

Method 100 can in addition include: enabling 160 the third software unit 20 if test 150 of whether the one or plurality of selected 140 postconditions can be forward-propagated 151 by the third software unit with regard to the formal verification turns out positive.

Method 100 can in addition include: enabling 161 third software unit 20 if the test 152 of whether the one or the plurality of postconditions selected 140 and forward-propagated 151 by the software unit with regard to the formal verification fulfill the one or the plurality of selected 141 preconditions per input variable 51 of complement 30 of third software unit 20 turns out positive.

Such an enabling 160, 161 can for example be used as proof in product liability cases.

In addition, at least one further third software unit 21 of the multiplicity of software units 20-25 can be selected and tested 150, 152 and/or enabled 160, 161 analogously to the third software unit. In this way, a loop over a plurality of and/or all the software units to be tested can be realized. In this way, a part and/or the entire software system 10 can be tested and ultimately enabled. Such an optional loop is shown schematically in FIG. 1 by the dashed arrow from step 160/161 to step 130/131.

Method 100 can include decomposition 110 of software system 10 into the multiplicity of software units 20-25. The decomposition 110 can for example take place in automated fashion e.g. according to the structure of the memory, the data files, the functions, the modules, the classes, and/or the subsystems. Alternatively or in addition, larger parts can be decomposed into smaller software units, for example by code clustering. Alternatively or in addition, the decomposition 110 of software system 10 into the multiplicity of software units 20-25 can be based on at least one input by a user (e.g. a programmer and/or a party responsible for the validation/verification) via a user interface of a programming and/or integration environment. As is illustrated schematically in FIG. 1, the decomposition can take place before step 120 and/or before a possible loop over a plurality of third software units.

The reception 120 of an item of context information for an interface between a first and a second software unit can include reading out 121*a* of at least one postcondition for the at least one output variable 40 of the first software unit, and/or reading out 121*b* of at least one precondition for the at least one input variable 50 of the second software unit from an annotation, in particular from a specification. This can be the case for example if the decomposition of software system 10 already exists or is already defined.

Alternatively or in addition, the reception 120 of an item of context information for an interface between a first and a second software unit can include creation 122*a* of at least one postcondition for the at least one output variable 40 of the first software unit and/or creation 122*b* of at least one precondition (e.g. through backward propagation and abstract calculation) for the at least one input variable 50 of the second software unit. The creation 122*a* of the at least one postcondition for the at least one output variable 40 of the first software unit can be based on at least one further precondition for at least one further input variable of the first software unit. The creation 122*b* of the at least one precondition for the at least one input variable 50 of the second software unit can be based on at least one further postcondition for at least one further output variable.

"Formal verification" can be understood as the formal proof of the correctness or freedom from error of the software unit or of a software system with regard to a formal specification, using automatic proof methods such as abstract interpretation or Bounded Model Checking.

According to the methods 100, 200 proposed in the present disclosure, formal verification methods can be made usable on large software systems by decomposing/separating the software system into small software units (e.g. subsystems, components, modules, functions) and enriching the resulting (open) interfaces to form dependent software units through context information from so-called contracts. This context information can include at least one precondition that has to hold for the software unit for it to be capable of being executed without error, as well as at least one postcondition that the software unit ensures after execution if its one or its plurality of preconditions have been fulfilled. These items of information can be manually annotated already during development, or can also be obtained automatically from the code through code analysis. The context information of a software unit to be analyzed, as well as the corresponding information of the dependent software units, can then be used to analyze this software unit. Through the smaller software units and/or the additional contextual knowledge at the interfaces, the precision of the analysis can be increased, and in this way false positive error messages can be reduced. For the actual testing of the smaller software units, already-existing tools for formal verification (such as those named above) can be used if the programming code to be tested is suitably prepared in advance.

Figure 3:
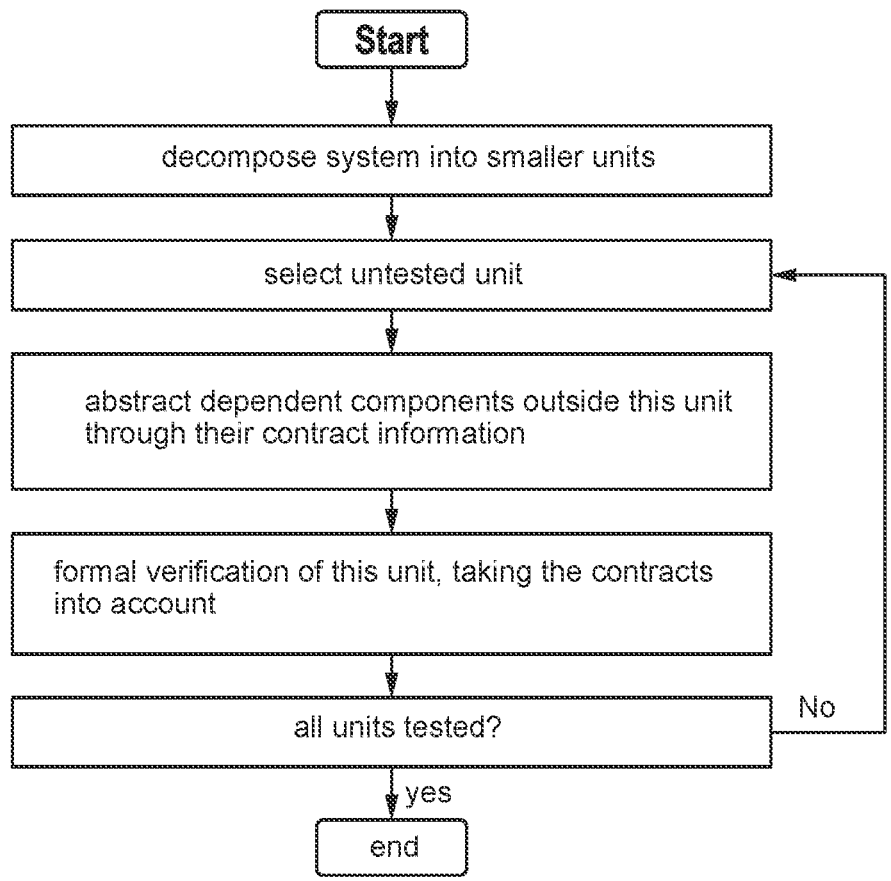
FIG. 3 shows an exemplary specific example embodiment of the computer-implemented method for the static testing of a software system.

FIG. 3 shows an example of a specific embodiment of the computer-implemented method for static testing of a software system.

In the first step, here the software system can be decomposed into smaller software units (referred to in FIG. 3 as "units" for short). Each of these software units can then be supplemented separately with items of contract information of the dependent software units, and subsequently can be formally verified. When all the software units have been successfully verified, the (entire) software system 10 is thereby also verified.

The decomposition of the software system into smaller software units can take place on the basis of naturally existing structures such as functions, modules, classes, subsystems. Alternatively, it can also take place through the formation of other structures that are optimized with regard to e.g. the width of the interfaces (clustering).

A respective software unit to be tested can be cut out from the software system. Its dependent software units (e.g. called functions, global variables, etc.) can be replaced by their contracts (see FIG. 2C). In this way, the behavior of the dependent software units can be taken into account in abstracted form, which has the result that the analysis of the behavior of the software unit to be tested (e.g. third software unit 20) can be carried out more precisely, and as a result the number of false positive (error) messages can be reduced.

For example, a software unit 24, 30 that is used could supply a value that is used as a divisor in software unit 20 to be tested. If the contract for software unit 24, 30 ensures that it always supplies values that are not equal to zero, then a division by zero at the corresponding location in software unit 20 can be excluded. If this knowledge is not present, then the analysis would yield a false positive error that can then be excluded only by manual inspection.

In addition, an integration test can be carried out (as also for example in method 200):

the maintaining of the preconditions (of the contract) of the software units used can take place directly in the context of the testing of the software unit. For this purpose, at the interface of the software units used the data handed over can be tested for compliance with their contract.

Alternatively, the integration test can also take place later. For this purpose, the data at the respective interfaces has to be collected, aggregated, and then tested against the contracts of the respective target software units (e.g. those having the input variables). If a software unit or a contract is modified, then only the corresponding software unit, and its neighbors, have to be retested. The rest of the system remains unaffected by this.

A possible implementation uses existing testing tools for the testing of the software units. The contracts are then implemented using the supported language means of these tools. In addition, the respective directives for setting value ranges or other knowledge about variables, as well as the directives for testing conditions (e.g. assert( )), are used. In this way, for each software unit used by the software unit to be tested, when it is called the validity of its preconditions can be tested (e.g. assert precondition), and the validity of its postconditions can be ensured (e.g. through corresponding setting of the return values). Analysis of the actual content of the software unit used is then no longer necessary for this purpose—it is abstracted by the contract.

Another possible implementation implements the formal verification in such a way that it can directly process both the programming code of the software system and also items of contract information, and can take them into account in the analysis.

Disclosed is at least one computer program that is designed to carry out the computer-implemented method 100 for the static testing of a software system. The computer program can be for example in interpretable or in compiled form. It can be loaded (including in parts) into the RAM of a control device or computer for execution e.g. as a bit or byte sequence; here a computer can also act as a server.

Also disclosed is a computer-readable medium or signal that stores and/or contains the at least one computer program. The medium can include e.g. one of RAM, ROM, EPROM, . . . , in which the signal is stored.

Also disclosed is a computer system that is designed to execute the computer program. The computer system can include in particular at least one processor and at least one working memory. In addition, the computer system can include a memory. The computer system can extend over a system including the server.

Also disclosed is a software unit that has been tested 150, 152 and/or enabled 160, 161 as third software unit 20 according to the computer-implemented method 100 for static testing of software system 10.

Also disclosed is a software system 10 in which each software unit of the multiplicity of software units 20-25 has been tested 150, 152 and/or enabled 160, 161 as the respective third software unit 20, 21 according to the computer-implemented method 100 for the static testing of software system 10.

Also disclosed is a method 300 that includes provision 310 of software system 10 in which each software unit of the multiplicity of software units 20-25 has been tested 150, 152 and/or enabled 160, 161 as a respective third software unit 20, 21 according to the computer-implemented method 100 for the static testing of software system 10. Method 300 can include the use 320 of software system 10. Method 300 can for example be used 320 during operation of, and for the controlling of, a driving system.

Also disclosed is a further computer-implemented method 200 for the static testing of a software system 10 that is decomposed into a multiplicity of software units 20-25, one or a plurality of interfaces being present between software units 20-25, each interface connecting a respective first and a respective second software unit of the multiplicity of software units 20-25 at least insofar as the respective first software unit has at least one output variable 40 that acts as at least one input variable for the respective second software unit.

Method 200 can include: the interface between a respective first and a respective second software unit, reception 220 of an interface criterion for the interface, the interface criterion including in each case at least one postcondition for the at least one output variable 40 of the respective first software unit and at least one precondition for the at least one input variable 50 of the respective second software unit, and the criterion being fulfilled when all preconditions are fulfilled by the associated postconditions.

Method 200 can further include: per interface between a respective first and a respective second software unit, testing 230 of whether the respective interface criterion for the interface is fulfilled.

Also disclosed is an alternative further computer-implemented method 200 for the static testing of a software system 10 that is decomposed into a multiplicity of software units 20-25, one or a plurality of interfaces being present between software units 20-25, each interface connecting a respective first and a respective second software unit of the multiplicity of software units 20-25 at least insofar as the respective first software unit has at least one output variable 40 that acts as at least one input variable for the respective second software unit.

The method 200 can include: reception 220 of at least one interface criterion for an interface between a respective first and a respective second software unit, the interface criterion including at least one postcondition for the at least one output variable 40 of the first software unit and at least one precondition for the at least one input variable 50 of the second software unit, and the criterion being fulfilled when all preconditions are fulfilled by the associated postconditions.

The method 200 can in addition include testing 230 of whether the interface criterion for the interface is fulfilled.

In general, and in method 200, a postcondition of an output variable does not have to be limiting over the variable type of the output variable. In other words, the calculation rule of the output variable can be surjective on the value range of the variable type. The postcondition then corresponds immediately to the requirement that the output variable lie in the value range of the variable type of the output variable. Likewise, a precondition of an input variable does not have to be limiting over the variable type of the input variable. In other words, a precondition would not be required, but can nonetheless immediately correspond to the requirement that the input variable lie in the value range of the variable type of the input variable. In this sense, method 200 can also be applied to interfaces that do not require a precondition and/or do not require a postcondition.

Method 200 can be expanded to take into account postconditions of global input variables and/or input variables of global output variables, a global interface resulting, for each global input variable or global output variable, that can be regarded, in method 200, as a (regular) interface.

The further computer-implemented method 200 and/or the alternative further computer-implemented method 200 can be designed to recognize and/or to avoid integration errors in an integration of software units 20, 25 of software system 10.

Method 200 can (as in method 100) include decomposition 210 of software system 10 into the multiplicity of software units 20-25.

Figure 4:
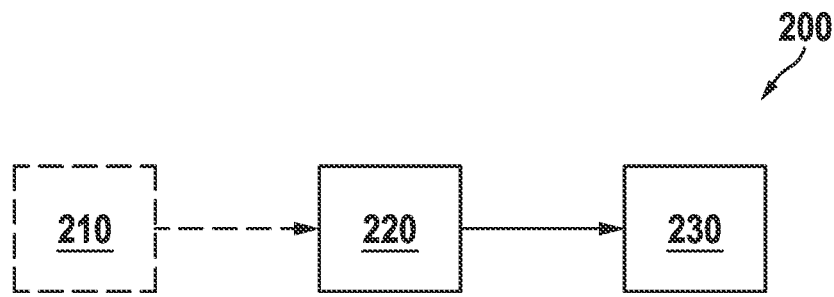
FIG. 4 schematically illustrates an (alternative) further computer-implemented method for the static testing of a software system, according to the present invention.

The further computer-implemented method 200 and/or the alternative further computer-implemented method 200 are illustrated schematically in FIG. 4.

What is claimed is:

1. A computer-implemented method for a static testing of a software system that is decomposed into a multiplicity of software units, one or a plurality of interfaces being present between the multiplicity of software units, each of the plurality of interfaces connecting a respective first software unit and a respective second software unit of the multiplicity of software units, at least insofar as the respective first software unit has at least one output variable that acts as at least one input variable for the respective second software unit, the computer-implemented method comprising the following steps:

receiving an item of context information for at least one interface of the plurality of interfaces, wherein the item of context information includes at least one postcondition for the at least one output variable of the respective first software unit and/or at least one precondition for the at least one input variable of the respective second software unit;

receiving a selection of a respective third software unit from the multiplicity of software units, in such a way that a substitute decomposition appertaining thereto of the software system into the respective third software unit and a complement of the respective third software unit is produced, wherein the respective third software unit and the complement of the respective third software unit form the software system and are connected via a substitute interface at least insofar as the complement of the respective third software unit has at least one output variable that acts as an input variable for the respective third software unit;

selecting, at least based on the item of context information received for the at least one interface of the plurality of interfaces, at least one postcondition per output variable of the complement of the respective third software unit that acts as the input variable of the respective third software unit; and testing whether the at least one selected postcondition per output variable of the complement of the respective third software unit can be forward-propagated by the respective third software unit with regard to a formal verification.

2. The computer-implemented method as recited in claim 1, wherein the respective third software unit and the complement of the respective third software unit also are connected at least insofar as the respective third software unit has at least one output variable that acts as an input variable for the complement of the respective third software unit, the computer-implemented method further comprising:
    selecting, at least based on the at least one item of context information, at least one precondition per input variable of the complement of the respective third software unit that is populated with data by an output variable of the respective third software unit; and
    testing whether the at least one selected postcondition per output variable of the complement of the respective third software unit and forward-propagated by the respective third software unit with regard to the formal verification fulfills the at least one selected precondition per input variable of the complement of the respective third software unit.

3. The computer-implemented method as recited in claim 2, further comprising:
    enabling the respective third software unit when the test of whether the at least one selected postcondition per output variable of the complement of the respective third software unit and forward-propagated by the respective third software unit with regard to the formal verification fulfills the at least one selected precondition per input variable of the complement of the respective third software unit is positive.

4. The computer-implemented method as recited in claim 1, wherein the computer-implemented method is configured to recognize runtime errors in the multiplicity of software units and/or in the software system.

5. The computer-implemented method as recited in claim 1, wherein the forward propagation of the at least one selected postcondition per output variable of the complement of the respective third software unit by the respective third software unit is based on abstract calculation.

6. The computer-implemented method as recited in claim 1, further comprising:
    enabling the respective third software unit when the test of whether the at least one selected postcondition per output variable of the complement of the respective third software unit can be forward-propagated by the respective third software unit with regard to the formal verification is positive.

7. The computer-implemented method as recited in claim 1, wherein at least one further third software unit of the multiplicity of software units is selected and tested and/or enabled analogously to the respective third software unit.

8. The computer-implemented method as recited in claim 1, further comprising:
    decomposing the software system into the multiplicity of software units.

9. The computer-implemented method as recited in claim 1, wherein the receiving the item of context information for the at least one interface of the plurality of interfaces includes:
    reading out the at least one postcondition for the at least one output variable of the respective first software unit from a specification; and/or
    reading out the at least one precondition for the at least one input variable of the respective second software unit from the specification.

10. The computer-implemented method as recited in claim 1, wherein the receiving the item of context information for the at least one interface of the plurality of interfaces includes:
    producing the at least one postcondition for the at least one output variable of the respective first software units; and/or
    producing the at least one precondition for the at least one input variable of the respective second software unit.

11. The computer-implemented method as recited in claim 10, wherein:
    the producing of the at least one postcondition for the at least one output variable of the respective first software unit is based on at least one further precondition for at least one further input variable of the respective first software unit, and/or
    the producing of the at least one precondition for the at least one input variable of the respective second software unit is based on at least one further postcondition for at least one further output variable of the respective second software unit.

12. A non-transitory computer-readable medium on which is stored a software unit that, as a respective third software unit, has been tested by a computer-implemented method for a static testing of a software system that is decomposed into a multiplicity of software units, one or a plurality of interfaces being present between the multiplicity of software units, each of the plurality of interfaces connecting a respective first software unit and a respective second software unit of the multiplicity of software units, at least insofar as the respective first software unit has at least one output variable that acts as at least one input variable for the respective second software unit, the computer-implemented method comprising the following steps:
    receiving an item of context information for at least one interface of the plurality of interfaces, wherein the item of context information includes at least one postcondition for the at least one output variable of the respective first software unit and/or at least one precondition for the at least one input variable of the respective second software unit;
    receiving the respective third software unit from the multiplicity of software units, in such a way that a substitute decomposition appertaining thereto of the software system into the respective third software unit and a complement of the respective third software unit is produced, wherein the respective third software unit and the complement of the respective third software unit form the software system and are connected via a substitute interface at least insofar as the complement of the respective third software unit has at least one output variable that acts as an input variable for the respective third software unit;
    selecting, at least based on the item of context information received for the at least one interface of the plurality of interfaces, at least one postcondition per output variable of the complement of the respective third software unit that acts as the input variable of the respective third software unit; and
    testing whether the at least one selected postcondition per output variable of the complement of the respective third software unit can be forward-propagated by the respective third software unit with regard to a formal verification.

13. A non-transitory computer-readable medium on which is stored a software system in which each software unit of a multiplicity of software units of the software system has been tested as a respective third software unit according to a computer-implemented method for a static testing of the software system, the software system being decomposed into the multiplicity of software units, one or a plurality of interfaces being present between the multiplicity of software units, each of the plurality of interfaces connecting a respective first software unit and a respective second software unit of the multiplicity of software units, at least insofar as the respective first software unit has at least one output variable that acts as at least one input variable for the respective second software unit, the computer-implemented method comprising the following steps:

receiving an item of context information for at least one interface of the plurality of interfaces, wherein the item of context information includes at least one postcondition for the at least one output variable of the respective first software unit and/or at least one precondition for the at least one input variable of the respective second software unit;

receiving a selection of the respective third software unit from the multiplicity of software units, in such a way that a substitute decomposition appertaining thereto of the software system into the respective third software unit and a complement of the respective third software unit is produced, wherein the respective third software unit and the complement of the respective third software unit form the software system and are connected via a substitute interface at least insofar as the complement of the respective third software unit has at least one output variable that acts as an input variable for the respective third software unit;

selecting, at least based on the item of context information received for the at least one interface of the plurality of interfaces, at least one postcondition per output variable of the complement of the respective third software unit that acts as the input variable of the respective third software unit; and testing whether the at least one selected postcondition per output variable of the complement of the respective third software unit can be forward-propagated by the respective third software unit with regard to a formal verification.

14. A method comprising:

providing, on a non-transitory computer-readable medium, a software system in which each software unit of a multiplicity of software units of the software system has been tested as a respective third software unit according to a computer-implemented method for a static testing of the software system, the software system being decomposed into the multiplicity of software units, one or a plurality of interfaces being present between the multiplicity of software units, each of the plurality of interfaces connecting a respective first software unit and a respective second software unit of the multiplicity of software units, at least insofar as the respective first software unit has at least one output variable that acts as at least one input variable for the respective second software unit, the computer-implemented method comprising the following steps:

receiving an item of context information for at least one interface of the plurality of interfaces, wherein the item of context information includes at least one postcondition for the at least one output variable of the respective first software unit and/or at least one precondition for the at least one input variable of the respective second software unit;

receiving a selection of the respective third software unit from the multiplicity of software units, in such a way that a substitute decomposition appertaining thereto of the software system into the respective third software unit and a complement of the respective third software unit is produced, wherein the respective third software unit and the complement of the respective third software unit form the software system and are connected via a substitute interface at least insofar as the complement of the respective third software unit has at least one output variable that acts as an input variable for the respective third software unit;

selecting, at least based on the item of context information received for the at least one interface of the plurality of interfaces, at least one postcondition per output variable of the complement of the respective third software unit that acts as the input variable of the respective third software unit;

testing whether the at least one selected postcondition per output variable of the complement of the respective third software unit can be forward-propagated by the respective third software unit with regard to a formal verification; and using the software system.

\* \* \* \* \*

UNITED STATES PATENT AND TRADEMARK OFFICE
CERTIFICATE OF CORRECTION

PATENT NO. : 11,977,478 B2
APPLICATION NO. : 17/868017
DATED : May 7, 2024
INVENTOR(S) : Andrea Flexeder et al.

It is certified that error appears in the above-identified patent and that said Letters Patent is hereby corrected as shown below:

On the Title Page

Add Item (30) Foreign Application Priority Data
-- (30) Foreign Application Priority Data
July 22, 2021 (DE) 10 2021 207 872.9 --

Signed and Sealed this
First Day of October, 2024

Katherine Kelly Vidal
*Director of the United States Patent and Trademark Office*